United States Patent [19]

Houck

[11] Patent Number: 4,863,288
[45] Date of Patent: Sep. 5, 1989

[54] FLOATING WHEEL DRAWER SLIDE

[75] Inventor: Peter J. Houck, Tulare, Calif.

[73] Assignee: Houck Industries, Inc., Tulare, Calif.

[21] Appl. No.: 273,663

[22] Filed: Nov. 18, 1988

Related U.S. Application Data

[63] Continuation of Ser. No. 128,019, Dec. 2, 1987, abandoned.

[51] Int. Cl.[4] .......................... A47B 88/14; F16C 19/00
[52] U.S. Cl. ........................................ 384/19; 384/58; 312/341.1 R
[58] Field of Search .................... 384/10, 19, 22, 38, 384/50, 57, 58; 312/341 R, 333

[56] References Cited

U.S. PATENT DOCUMENTS

| | | | |
|---|---|---|---|
| 2,328,835 | 9/1943 | Motter | 312/333 |
| 2,843,444 | 7/1958 | Nelson | 312/341 R |
| 2,912,288 | 11/1959 | Griswold, Jr. | 384/58 X |
| 3,099,501 | 7/1963 | Hillson et al. | 384/19 |
| 3,243,237 | 3/1966 | Sprecher | 384/19 |
| 3,361,489 | 1/1968 | Gionet | 384/19 |
| 3,874,748 | 4/1975 | Figueroa | 384/19 |
| 4,564,248 | 1/1986 | Grass | 312/333 X |

Primary Examiner—Thomas R. Hannon
Attorney, Agent, or Firm—Townsend and Townsend

[57] ABSTRACT

A side-mount drawer slide with a floating wheel permitting lateral movement of the drawer to compensate for skewness in the drawer and/or supporting cabinet. A drawer slide of the type having a track attached to the drawer and a corresponding track attached to the adjacent wall is provided with a pair of wheels, one secured at an end of each track. On one side the wheels have only minimal lateral play. On the other side the wheels have a substantial predetermined lateral play to compensate for lack of parallelism in the walls of the cabinet and/or drawer so as to avoid the need for shimming the tracks when the drawer and/or cabinet are not parallel.

5 Claims, 1 Drawing Sheet

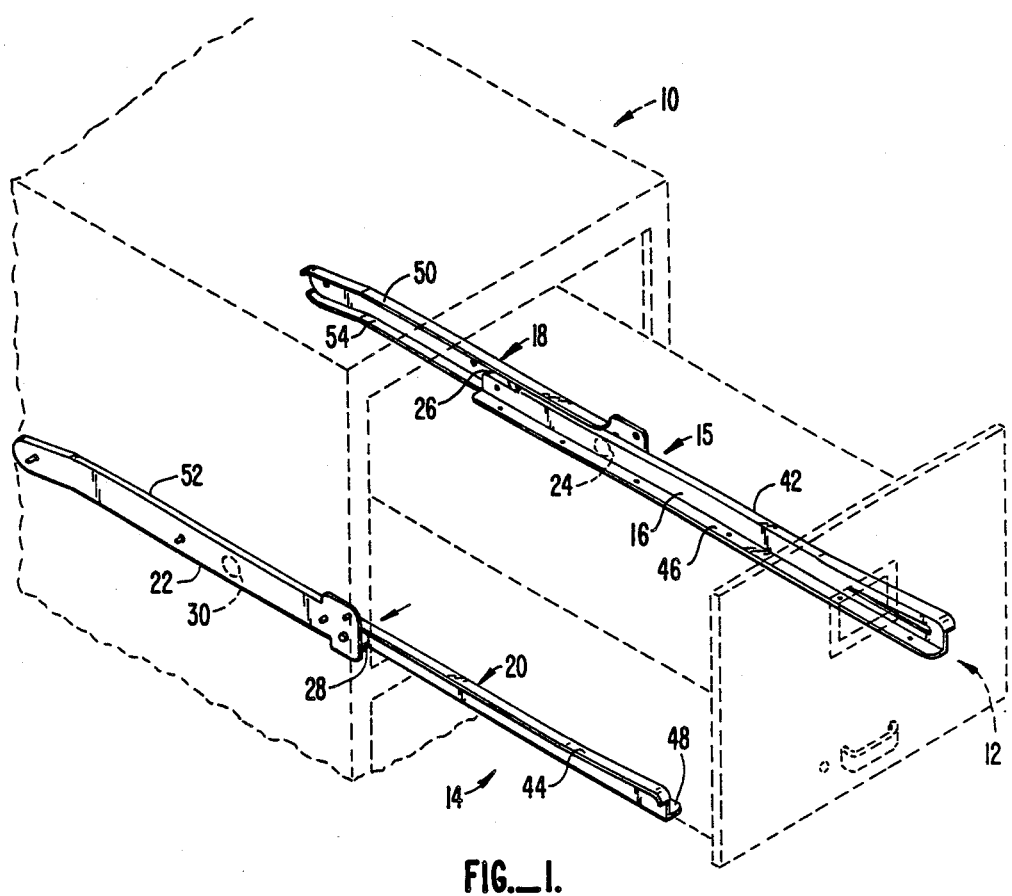
FIG._1.
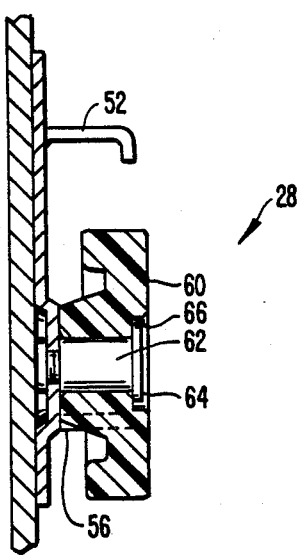
FIG._2A.
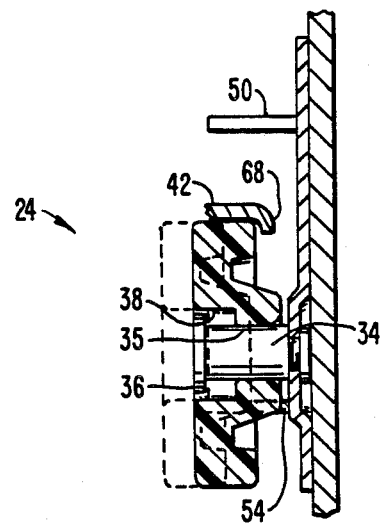
FIG._2B.

FLOATING WHEEL DRAWER SLIDE

This is a continuation of application Ser. No. 128,019, filed Dec. 2, 1987, now abandoned.

BACKGROUND OF THE INVENTION

The invention relates generally to slides for mounting drawers or the like in cabinets or other furniture and is more particularly addressed to slides of the side-mount variety.

Side-mount slides generally include a drawer unit or member that is mounted on a side of a drawer and an associated cabinet unit or member that is mounted on the inner face of the cabinet side wall or frame. A pair of associated drawer and cabinet members is mounted at each side of the respective drawer and cabinet, and the associated members engage one another so as to support and guide the drawer as it is pulled out of the cabinet.

To assist in making the drawer more easily, each drawer and cabinet unit may include a track and a wheel rotatably mounted at one end of the track. Associated drawer and cabinet units are configured such that the wheel of the drawer unit rolls in the track of the frame unit, and the wheel on the frame unit rolls in the track of the drawer unit. Each track may also be provided with configurations of lips or ledges to capture and guide the wheel rolling therein and to assist in preventing the slide members from pulling apart from one another. As the drawer is opened, one of the units telescopes out from the other, allowing the drawer to glide open in a smooth manner. A slide typical of the prior art is disclosed in U.S. Pat. No. 4,564,248 to Grass entitled "Pull-Out Guide for Drawers" and in U.S. Pat. No. 2,328,835 to Motter entitled "Drawer Construction."

A problem common to prior art slides is the requirement for close tolerance in the construction of the drawer and cabinet frame. Unless the drawer and cabinet frame are constructed with sides parallel to each other within a tolerance of approximately ⅛ inch, the drawer will have a strong tendency to bind as it is moved in and out. When known slides are used on a cabinet lacking the requisite degree of parallelism, the cabinetmaker has to resort to shims or the like to correct the deficiency. Shims are commonly inserted between a cabinet members and the cabinet, either at the front or rear, to compensate for the lack of parallelism. To the cabinetmaker, the use of shims is undersirable because it requires significant additional time and effort.

Even well made furniture may vary in its dimensions, parallelism, straightness, and so forth over time due to the effects of use, abuse, and environment on the wood components in the drawers or frames. Known slides may function well initially but may tend to blind as the furniture ages and becomes slightly skewed. On the other hand, inexpensively made furniture is often manufactured with very loose tolerances and at the onset presents a problem to the slide installer. Likewise, do-it-yourself cabinetmakers often have difficulty constructing furniture with the requisite degree of parallelism to mount drawers using the conventional slides without resorting to corrective shims.

SUMMARY OF THE INVENTION

The present invention provides a drawer slide that automatically compensates for a significant degree of non-parallelism between cabinet and drawer and obviates the need for shimming in all but extreme cases. The slide gives the professional cabinetmaker and the do-it-yourselfer a margin of error within which to construct drawers in furniture not previously enjoyed without the frustrations and tedium of installing corrective shims.

The invention achieves its effect through an improvement in known side-mount drawer slides of the type described above having paired cabinet and drawer members to be affixed to the cabinet side-wall or frame and drawer, respectively. The slide includes at least one wheel assembly, which has a wheel mounted to one of the paired members, which are then coupled by rolling engagement of the wheel with the other of the paired members. According to the invention the wheel assembly is structured to allow a significant predetermined lateral movement of the wheel such that the cabinet and drawer members can move laterally with respect to one another by an amount compensating for the typical deviations from parallelism in the cabinet frame or drawer encountered in practice.

A further understanding of the nature and advantages of the invention will be gained by reference to the following portions of the specification and the appended claims and drawings.

BRIEF DESCRIPTION OF THE DRAWINGS

FIG. 1 is a perspective view showing a drawer slide installed in a cabinet frame according to the present invention.

FIG. 2A is a cross-sectional view of the left cabinet member and fixed wheel assembly of FIG. 1.

FIG. 2B is a cross-sectional view of the right cabinet member and floating wheel assembly of FIG. 1.

DETAILED DESCRIPTION OF THE PREFERRED EMBODIMENTS

For purposes of illustration, the invention is described herein with reference to the drawings. Those skilled in the art will readily recognize from this description that the invention may be configured in other ways; accordingly, it is not intended to limit the invention to the specific embodiment presented here.

FIG. 1 shows a cabinet 10 in which is mounted a drawer 12 by means of a pair of side-mount slides 14 and 15 according to the invention. The right slide 15 includes an elongate right drawer member 16 and right cabinet member 18. The left slide 14 includes an elongate left drawer member 20 and left cabinet member 22. The elongate cabinet members 18 and 22 are mounted horizontally in conventional manner on the inside side walls of the cabinet 10. The side members 18 and 22 may be fixed directly to the inside face of the cabinet walls themselves or to a framework as is appropriate in the particular furniture design. In the embodiment of the invention illustrated here each slide 14 and 15 includes a pair of wheel assemblies 24, 26, 28, and 30. The right slide wheel assemblies 24 and 26 are mounted, respectively, to the forward portion of the cabinet member 18 and rear portion of the drawer members 16, as will be described more fully below. The left slide wheel assemblies 28 and 30 are mounted, respectively, to the forward portion of the left cabinet member 22 and rear portion of the left drawer member 20.

According to the invention, the wheel assemblies of the right slide 15 are "floating" wheel assemblies. As used herein, the term "floating wheel assembly" refers to an assembly in which the wheel is deliberately given a predetermined amount of lateral, i.e., side-to-side, play of an amount of least about 3/32 inch. It is the lateral movement of floating wheel assemblies 24 and 26 that provides compensation for lack of parallelism of the cabinet and drawer and eliminates the need for shims in most cases.

The forward floating wheel assembly 24 of cabinet member 18 will now be described with reference to FIG. 2B. The rear floating wheel assembly 26 of the associated drawer member 16 is constructed similarly. Floating wheel assembly 24 includes floating wheel 32 mounted on axle 34. The axle 34 is in the form of a post passing through hole or bore 35 in the center floating wheel 32 and is secured to the cabinet member 18 to extend perpendicularly from the cabinet side wall.

The axle 34 is formed with a flange 36 at its distal end serving as a stop. The wheel 32 is, in turn, formed with a recessed region 38, in the form of a counterbore, which has a sufficiently large diameter to receive the stop 36.

Floating wheel 32 rotates freely about the axis of axle 34, but is free to slide laterally along the axle a predetermined distance determined by the depth of the recessed region 38. In FIG. 2B the furthest right position of the wheel 32 is shown in solid lines and the furthest left position is shown in phantom.

Conventional, non-floating wheels are constructed with a certain amount of lateral play so that they can turn freely. Conventional wheels for drawer slides typically have on the order of 0.04 inch of lateral play. The overall lateral play in the floating wheels is preferably approximately 3/32 inch (0.09375 inch), so that the counterbore depth in the floating wheels will be deeper than in the non-floating wheels by an amount generally less than 3/32 inch, but may, of course, be deeper. This produces a slide which has been found capable of compensating for the range of non-parallelism most commonly met in practice.

Of course, no matter what amount of lateral movement a floating wheel is able to undergo, an occasional piece of furniture will be found which is more skewed than can be corrected by any particular slide. In such cases the residual skewness not compensated for by the present invention will generally be minor and can readily be corrected by a small amount of shimming.

The wheel assemblies 28 and 30 of the left slide are of the non-floating type. FIG. 2A shows the construction of the left forward wheel assembly 28 affixed to the left cabinet member 22. The wheel assembly 28 includes wheel 60 and axle 62, also terminated in flange 64 as in the right wheel assembly of FIG. 2B. The wheel 60 is provided with a shallow recessed area, or counterbore, 66, which unlike the recessed area 38 of the floating wheel has a depth roughly comparable to the thickness of the flange 64. Constructed in this manner, the wheel 60 will exhibit comparatively little lateral play.

The right and left drawer members 16 and 20 are formed with upper lips 42 and 44, respectively, and lower ledges 46 and 48 for supporting the drawers. The associated right and left cabinet members 18 and 22 are formed with upper lips 50 and 52, respectively, and lower ledges 54 and 56, respectively.

As shown in FIG. 1, right drawer member 16 engages right cabinet member 18 and left drawer member 20 engages left cabinet member 22. Upper lip 44 on drawer member 20 overhangs and makes rolling contact with the upper face of wheel 60 of the foreward wheel assembly 22, while upper lip 52 and lower ledge 56 of cabinet member 22 make rolling contact with, respectively, the upper and lower faces of the wheel of rear wheel assembly 30. On the right side, upper lip 42 on drawer member 16 overhangs and makes rolling contact with the uppermost face of floating wheel 32 of the foreward wheel assembly 24, while upper lip 42 and lower ledge 46 of the cabinet member 18 make rolling contact with, respectively, the upper and lower faces of the wheel of rear assembly 26. The overhang 68 of upper lip 42 serves to capture the floating wheel 32 and to pull it laterally as needed.

In the preferred embodiment both the foreward and rear wheel assemblies on one side have floating wheels, while the wheel assemblies on the other side are non-floating. In the specific embodiment illustrated here, the floating wheel assemblies are on the right side; however, they may also be positioned on the left side.

Alternatively, a pair of slides according to the invention may be configured with both left and right slides having floating wheels, each having roughly one-half the characteristic lateral play described above. In this symmetrical configuration the necessary compensating lateral movement of the drawer within the cabinet is shared between the two slides. Although it is preferred to have two of the wheel assemblies on one side floating, some advantage of the invention will still be achieved if only one wheel assembly is floating.

While the above provides a full and complete disclosure of illustrative embodiments of the invention, various modifications and equivalents will occur to those skilled in the art given the benefit of this disclosure. For example, to provide the characteristic lateral movement of the floating wheels, instead of forming the wheels with deep recessed regions, as illustrated above, the wheels may alternatively be mounted on extensible mounts, such as a pair of telescopingly configured cylindrical members, the outer one carrying the wheel and the inner one affixed at one end to the appropriate slide member. Accordingly, the invention is not intended to be limited only to the specific examples and embodiments disclosed herein, but is defined by the appended claims.

What is claimed is:

1. In a drawer slide for mounting a drawer in a cabinet having nominally parallel sidewalls, the drawer slide being of the type comprising a first, cabinet member adapted to be affixed to the cabinet, a second, drawer member adapted to be affixed to the drawer, and a wheel assembly, having a wheel mounted on an axle, mounted to a first of said cabinet and drawer members, said cabinet and drawer members and said wheel assembly being structured and arranged such that the other of said cabinet and drawer members rolls against said wheel as said drawer is moved in and out of said cabinet, the improvement wherein:
    said wheel assembly is structured and arranged to permit unbiased free travel of said wheel along said axle over a predetermined range of at least about 3/32 inch, whereby said wheel assembly provides for automatic lateral self-adjustment of said drawer slide to compensate for cabinets having sidewalls deviating significantly from parallel configuration.

2. The invention of claim 1, wherein:
    said axle is formed with a stop at its distal end; and
    said wheel is mounted to slide laterally on said axle and is formed with a centrally disposed recessed region for receiving said stop and having a depth sufficient to provide said at least about 3/32 inch of lateral movement on said axle.

3. The invention of claim 1 wherein one of said cabinet and drawer members includes a lip formed for capturing said wheel and sized and configured to urge said wheel longitudinally along said axle.

4. In a drawer slide for mounting a drawer in a cabinet having nominally parallel sidewalls, the drawer slide being of the type comprising a first, cabinet member adapted to be affixed to the cabinet, a second, drawer member adapted to be affixed to the drawer, a first wheel assembly, having a wheel mounted on an axle, mounted to a first of said cabinet and drawer members generally at the forward portion thereof, a second wheel assembly, mounted on an axle, mounted to the other of said cabinet and drawer members generally in the rear portion thereof, and a lip formed for capturing one of said wheels, said cabinet and drawer members and said wheel assemblies being structured and arranged such that said members roll against said wheels as said drawer is moved in and out of said cabinet, the improvement wherein:

each said wheel assembly is structured and arranged to permit unbiased free travel of the included wheel along the included axle over a predetermined range of at least about 3/32 inch, and said lip is sized and configured to urge said captured wheel longitudinally along its respective axle, whereby said wheel assemblies and lip provide for automatic lateral self-adjustment of said drawer slide at both the forward and rear portions thereof to compensate for cabinets having sidewalls deviating significantly from parallel configuration.

5. The invention of claim 4, wherein:

each said axle is formed with a stop at its distal end; and each said wheel is mounted to slide laterally on its respective axle and is formed with a centrally disposed recessed region for receiving the respective stop as the wheel moves laterally on its respective axle and having a depth sufficient to provide said at least about 3/32 inch of lateral movement.

* * * * *